United States Patent
Groben

(10) Patent No.: US 9,534,614 B2
(45) Date of Patent: Jan. 3, 2017

(54) SAFETY DEVICE FOR PRESSURE-MEDIUM-CONTAINING TANKS

(75) Inventor: Martin Groben, Sulzbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 1454 days.

(21) Appl. No.: 12/451,475

(22) PCT Filed: May 9, 2008

(86) PCT No.: PCT/EP2008/003729
§ 371 (c)(1),
(2), (4) Date: Nov. 13, 2009

(87) PCT Pub. No.: WO2009/006961
PCT Pub. Date: Jan. 15, 2009

(65) Prior Publication Data
US 2010/0126597 A1 May 27, 2010

(30) Foreign Application Priority Data
Jul. 11, 2007 (DE) .......................... 10 2007 032 207

(51) Int. Cl.
*F23D 14/72* (2006.01)
*F15B 1/08* (2006.01)
(Continued)

(52) U.S. Cl.
CPC . *F15B 1/08* (2013.01); *F16K 1/04* (2013.01); *F16K 24/04* (2013.01); *F15B 2201/4155* (2013.01); *Y10T 137/7069* (2015.04)

(58) Field of Classification Search
CPC ....... F15B 1/08; F15B 2201/4155; F16K 1/04; F16K 24/04; Y10T 137/7069
(Continued)

(56) References Cited

U.S. PATENT DOCUMENTS 1,733,309 A * 10/1929 Warren .......................... 251/211
2,827,913 A * 3/1958 Wagner .......................... 137/318
(Continued)

FOREIGN PATENT DOCUMENTS

DE        68 519 A     5/1893
DE     2 000 355 A1    7/1971
(Continued)

OTHER PUBLICATIONS

EPO Translation of Foreign Document DE 19511525 Published on Oct. 2, 1996.*

*Primary Examiner* — Craig Schneider
*Assistant Examiner* — P. Macade Nichols
(74) *Attorney, Agent, or Firm* — Wenderoth, Lind & Ponack, L.L.P.

(57) ABSTRACT

A safety device for closure elements (1) on pressure-medium-containing tanks, in particular on hydropneumatic devices such as hydraulic accumulators, has a screw connection provided as a closure device on a filling or checking port. The screw connection has a closure screw (1) threadedly engaged on the port (3) and blocking the port (3) when the screw connection is tightened and opens the port (3) when a flow path is released. A device (25) limits the free movement path of the closure element (1) when moved out of a closed position as a result of occurring overpressure.

10 Claims, 4 Drawing Sheets

(51) Int. Cl.
*F16K 24/04* (2006.01)
*F16K 1/04* (2006.01)

(58) Field of Classification Search
USPC ...... 137/625.32, 68.11, 68.16, 383; 251/216, 251/217, 284, 218, 92; 220/303, 304; 411/2, 3, 411/5
See application file for complete search history.

(56) References Cited

U.S. PATENT DOCUMENTS

| | | | | |
|---|---|---|---|---|
| 3,323,546 A | * | 6/1967 | Lord | 137/615 |
| 3,472,427 A | * | 10/1969 | Schaefer | 222/147 |
| 3,865,344 A | * | 2/1975 | Hayes, Jr. | 251/284 |
| 4,142,546 A | | 3/1979 | Sandau | |
| 4,379,707 A | * | 4/1983 | Fisher | 464/162 |
| 4,601,305 A | * | 7/1986 | Nordskog | 137/528 |
| 5,713,705 A | * | 2/1998 | Grunbichler | 411/5 |

FOREIGN PATENT DOCUMENTS

| | | |
|---|---|---|
| DE | 2 238 356 A1 | 2/1974 |
| DE | 195 11 525 C2 | 10/1996 |

\* cited by examiner

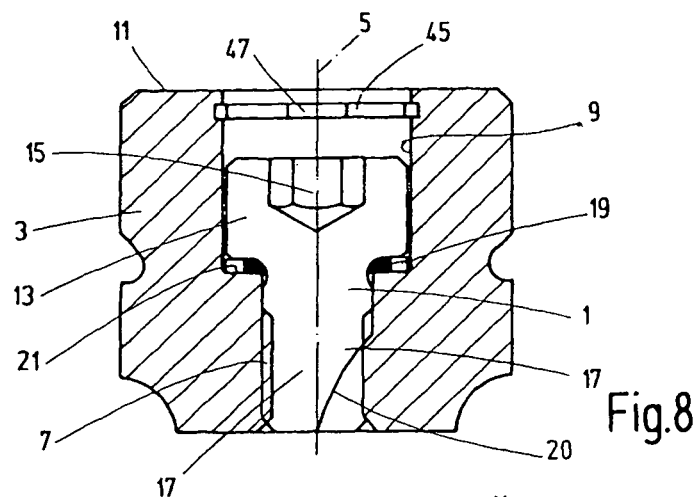
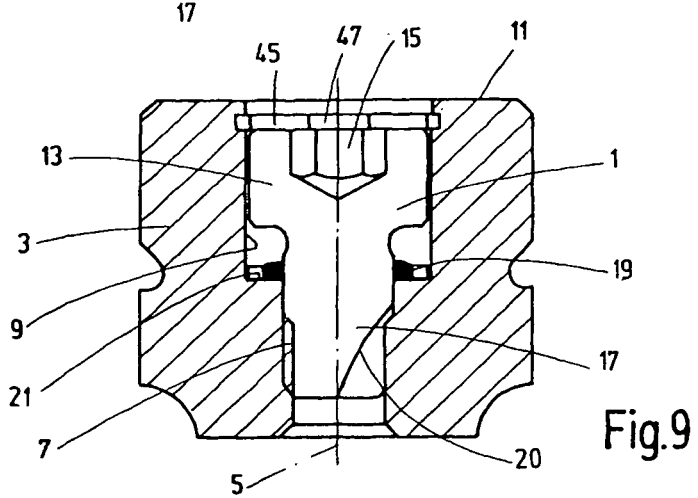
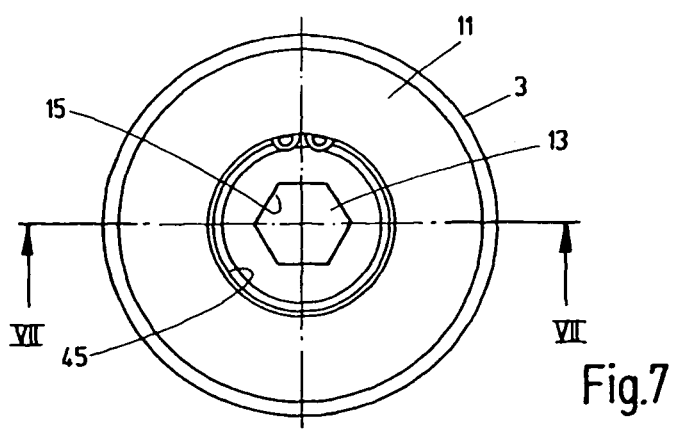

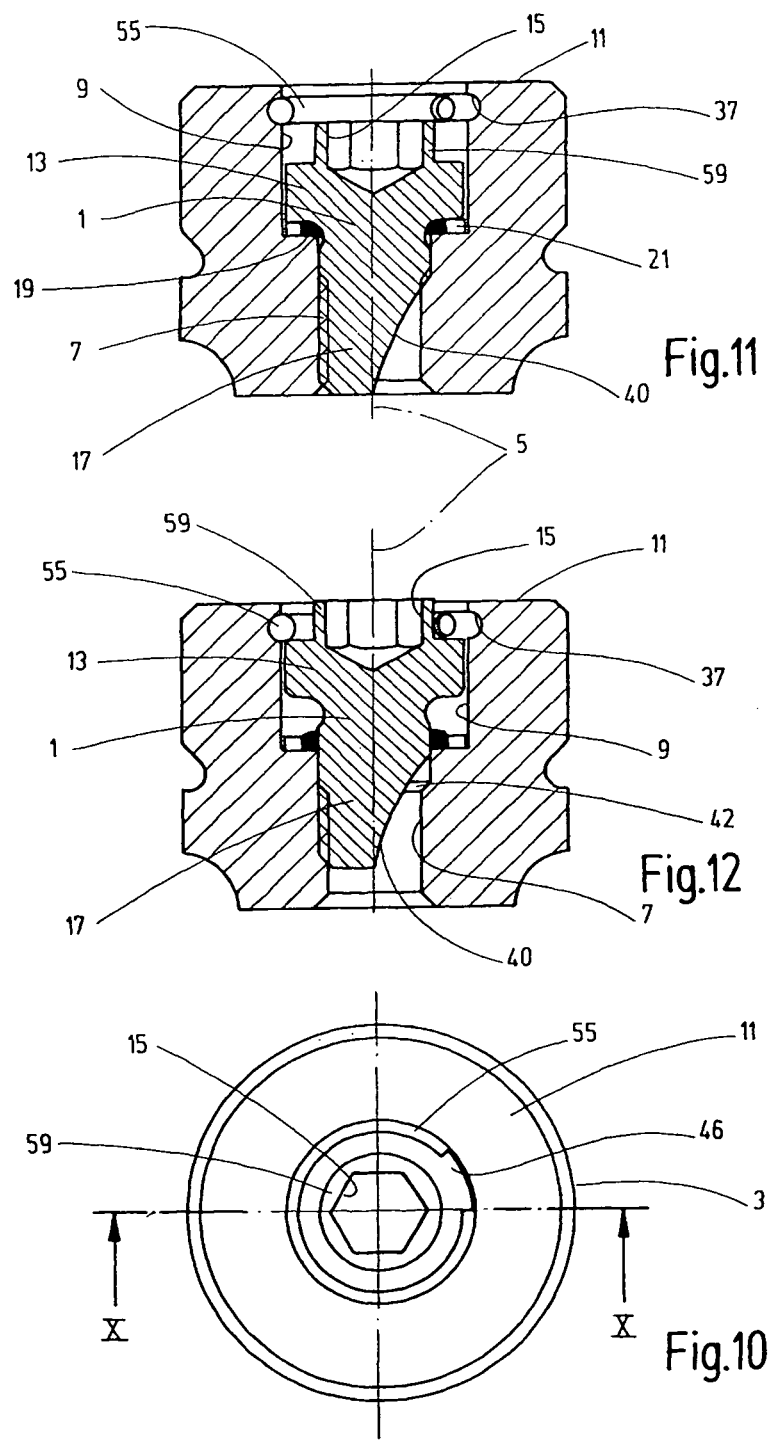

SAFETY DEVICE FOR PRESSURE-MEDIUM-CONTAINING TANKS

FIELD OF THE INVENTION

The invention relates to a safety device for pressure-medium-containing tanks, in particular hydropneumatic devices such as hydraulic accumulators. On a filling or checking port the closure device is a screw connection with a closure screw threadedly engaged in the port. When the screw connection is tightened, the port is blocked gastight. When the screw connection is loosened, a flow path through the port is cleared.

BACKGROUND OF THE INVENTION

In hydropneumatic devices such as diaphragm accumulators or piston accumulators, the prior art involves filling processes or checking processes in which the gas filling pressure is monitored. On the filling or checking port, a closure screw is tightened to block the port gastight and is loosened forming a flow path with a passage size sufficient for the filling or checking process. The execution of these processes is relatively simple if, before loosening the closure screw, a filling and checking device is attached to the port of the tank. In the event that such device attached tightly to the port is not used, a not inconsiderable hazard potential exists if it is improperly operated, i.e., not according to specifications. According to specifications, the procedure should include loosening the closure screw, for example, by a manually activated hexagon socket wrench, simply by a small amount, for example, on the order of one half turn. If this specification is not met, and the screw is not only loosened, but turned too far, the danger exists that the closure screw will be ejected by force by the gas pressure which has not yet decreased. If a filling and checking device is not attached to the port, the device will also be ejected from the tank by force. These ejections endanger the vicinity and constitute a corresponding accident hazard for personnel. This danger prevails mainly when, instead of a manual turning tool, a power tool is used, such as, for example, a power drill.

SUMMARY OF THE INVENTION

An object of the invention is to provide a safety device preventing an ambient hazard in the filling and checking processes for pressurized containers.

According to the invention, this object is basically achieved by a safety device where only one path of motion or stroke is available for the closure screw when the screw connection is loosened. For the screw connection, threaded engagement is maintained precluding the danger of the screw being ejected by force.

In advantageous embodiments, for the closure screw screwed to the port of the tank, a blocking element is anchored in the port to limit the free path of the closure screw moving relative to the threaded hole in the port. This blocking element ensures that no danger exists of the screw being ejected by force.

The remaining threaded engagement for the closure screw also advantageously provides for the blocking element a simple construction that is easy to install because there is a safety action with comparatively small blocking forces applied by the blocking element to the screw.

Preferably, the port has a segment adjacent to the tank interior with a threaded hole for the shaft of the closure screw and an adjoining segment in the form of a hollow cylinder for holding the head of the closure screw. The blocking element on the hollow cylinder is anchored such that it forms stop surfaces projecting into the interior of the hollow cylinder and limiting the movement of the closure screw out of the closure position by coming into direct contact with the head of the screw.

On the bottom of the hollow cylinder on the opening edge of the threaded hole, a sealing arrangement in the closed position can be adjoined by the bottom of the head of the closure screw to form a seal. The path of motion of the closure screw can be then limited preferably to an end position in which between the sealing arrangement and the head of the closure screw there is a distance such that the flow path for passage of the medium is formed.

Since, as already mentioned, the path of the closure screw is already limited before it has disengaged from the screw connection, the design for the blocking element can be simple. Thus, the blocking element can be formed, for example, by a cylindrical grooved pin. In the outer edge region of the hollow cylinder in the pin wall, the pin is seated in a hole extending transversely to the axis of the cylinder. In an alternative solution characterized by especially easy installation, the blocking element is formed by a snap ring or an elastic locking ring sitting in an annular groove formed in the outer edge region in the inside wall of the hollow cylinder.

In especially advantageous embodiments, in addition to the blocking element, as another means for limiting the path of motion of the closure screw, a device limits the torque which can be transmitted to the closure screw as it is being unscrewed. By limiting the torque which can be applied as the screw is being unscrewed, especially low demands need be imposed on the structural strength of the blocking element. For example, short snap rings that are especially easy to install can then be used as the blocking element.

For a closure screw with a head provided with a hexagon socket, the torque-limiting device can be designed such that the head has a reduced outside diameter in its end segment for forming the sleeve surrounding the hexagon socket. The wall thickness of the sleeve is chosen to shear off when a certain torque acting on the wall of the hexagon socket is exceeded. After shearing off of the sleeve forming the wall of the hexagon socket, further torque cannot be transferred to the screw head by the pertinent turning tool.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 7 is a top plan view of a port with a safety device according to a third exemplary embodiment of the invention;

FIGS. 8 and 9 are side elevational views in section taken along line VII-VII of FIG. 7, with FIG. 9 showing the operating state when the safety device of FIG. 7 has taken effect;

FIG. 10 is a top plan view of a port with a safety device according to a fourth exemplary embodiment of the invention; and FIGS. 11 and 12 are side elevational views in section taken along line X-X of FIG. 10, with FIG. 12 showing the state of the loosened screw connection of FIG. 10.

DETAILED DESCRIPTION OF THE INVENTION

The invention is described below with reference to the drawings using exemplary embodiments in which a gas fill screw 1 is the closure element and is screwed into a port 3 provided on the gas side of a hydraulic accumulator (not shown). Port 3 functions as a filling port for filling the accumulator with a working gas, such as nitrogen gas, or as a checking port. The invention can be designed equally as a safety device for closure elements of another type.

Figure 2:
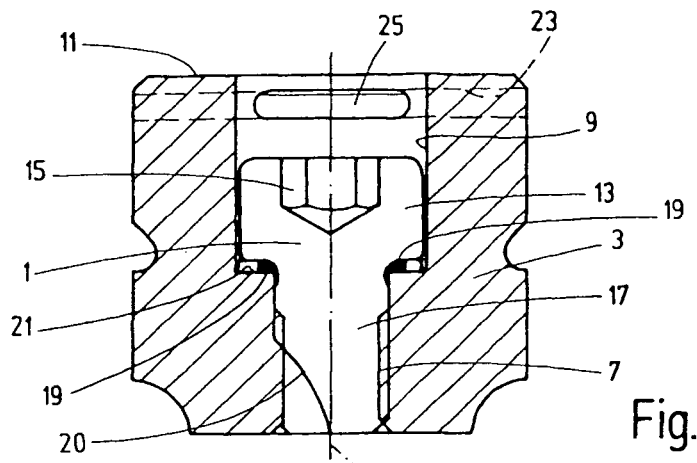
FIG. 2 is a side elevational view in section of the port of FIG. 1 taken along line I-I of FIG. 1.
Figure 3:
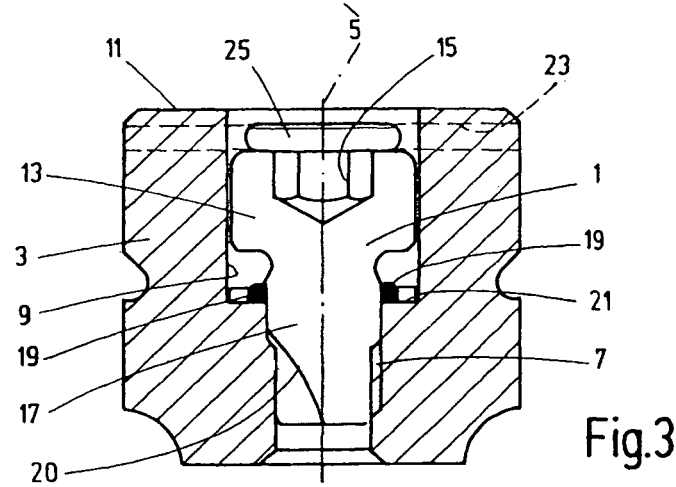
FIG. 3 is a side elevational view in section corresponding to FIG. 2 and showing the operating state when the safety device of FIG. 1 has taken effect.
Figure 1:
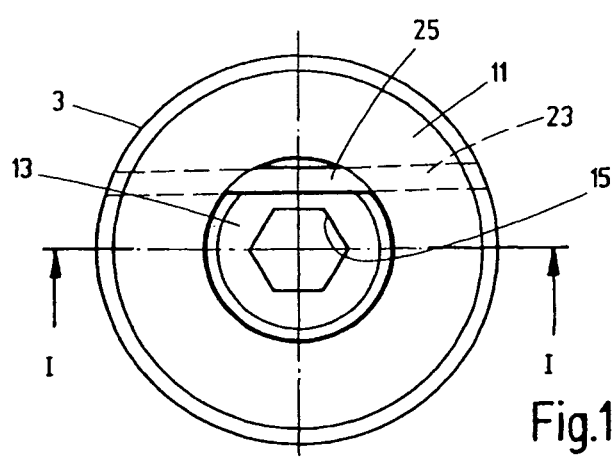
FIG. 1 is a top plan view of a port on the gas filling port of a hydraulic accumulator (not shown), provided with a safety device according to a first exemplary embodiment of the invention.

FIGS. 1 to 3 show a first embodiment in which the port 3 has a largely circularly cylindrical shape. A threaded hole 7 is formed concentrically to the longitudinal axis 5 in the end region facing the gas side of the hydraulic accumulator (not shown). Toward the other outer end, the threaded hole 7 is joined to an inner hollow cylinder 9 widened relative to threaded hole 7, likewise concentric to the axis 5 and open on the outer end 11 of the port 3. The head 13 of the screw 1 is held within the hollow cylinder 9. Using an hexagon socket 15 coaxial with the screw longitudinal axis and located in the head 13, the screw 1 with its shaft 17 is screwed or threaded to the threaded hole 7. The screw 1 normally assumes the closure position shown in FIG. 2, in which the bottom of the head 13 adjoins a sealing arrangement of sealing elements 19 and 21 to form a seal. The sealing arrangement is mounted on the bottom surface of the hollow cylinder 9 surrounding the opening edge of the threaded hole 7. This sealing arrangement includes of an outer soft iron ring 21 and an elastomer ring 19 surrounding the shaft 17 of the screw 1.

In the vicinity of the outer end 11 of the port 3, the wall of the hollow cylinder 9 is penetrated by a transverse hole 23 perpendicular to the axis 5 and forming the seat for the cylindrical grooved pin 25. Pin 25 is laterally offset from socket 15 and is inserted in an installation process after the screw 1 has been screwed in and tightened in its closure position, as is shown in FIG. 2 showing the screw 1 in its closure position. The elastomer ring 21 is pressed by the bottom of the head 13 adjoining the soft iron ring 19.

FIG. 3 shows that when the screw 1 is unscrewed or unthreaded, the shaft 17 of the screw 1 in the threaded hole 7 has been displaced to the outside. The path of displacement is limited in the end position shown in FIG. 3 by contact of screw 1 with the cylindrical grooved pin 25 used as the blocking element. Raising the bottom of the head 13 of the screw 1 off the sealing element 19 leads to clearance of a flow path, its passage size being determined according to the amount of migration of the shaft 17 in the threaded hole 7. An arched groove 20 extending in the longitudinal and radial directions is formed on the shaft 17 of the screw 1 and extends from the free end of the threaded shaft as a narrow interruption of the thread and extends beyond the threaded region of the threaded hole 7 in the open position to promote the formation of a passage for the medium. Placing the cylindrical grooved pin 25 acting as a blocking element protects the screw 1 against being ejected by force from the port 3. By limiting the length of the path when unscrewing, an at least partial thread engagement of the shaft 17 in the threaded hole 7 remains.

Figure 5:
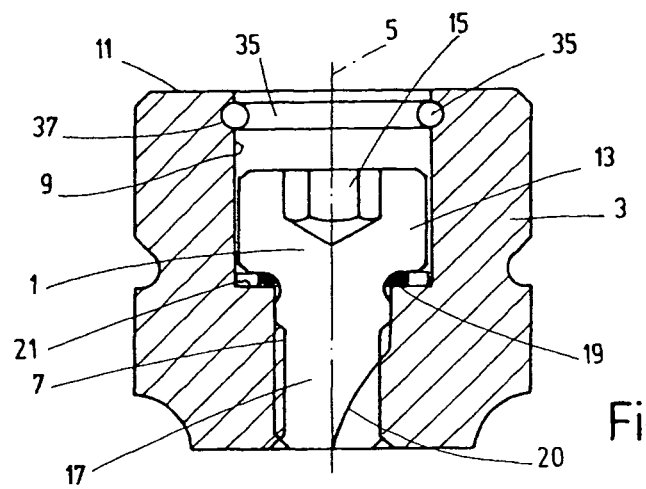
FIGS. 5 and 6 are side elevational views in section taken along line IV-IV of FIG. 4, with FIG. 6 showing the operating state when the safety device of FIG. 4 has taken effect.
Figure 6:
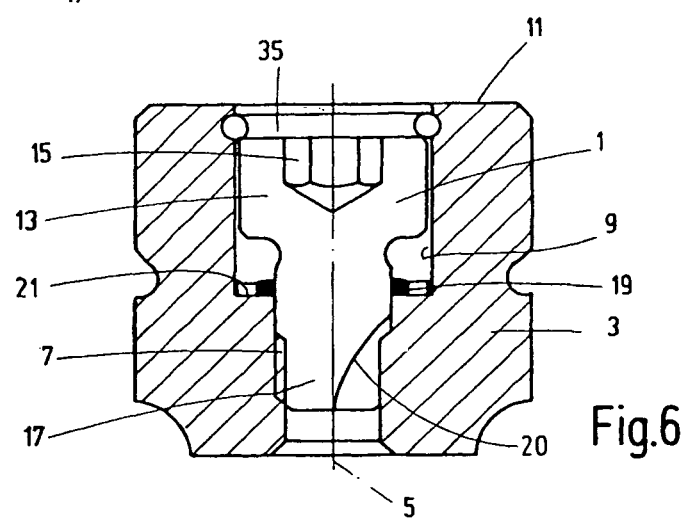
Figure 4:
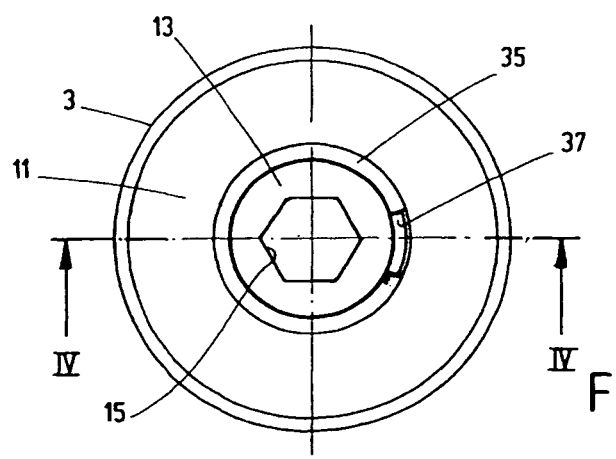
FIG. 4 is a top plan view of a port with a safety device according to a second exemplary embodiment of the invention.

FIGS. 4 to 6 show a second embodiment distinguishable from the first embodiment simply by a different design of the blocking element. The description of this embodiment can then be limited to the dissimilarity of the blocking element. The blocking element in this second embodiment is formed by a snap ring 35 secured in an annular groove 37 and laterally offset from the screw longitudinal axis. Similar to the transverse hole 23, groove 37 is located in the vicinity of the outer end 11 of the port 13. The annular groove 37 is machined into the inside wall of the hollow cylinder 9. Since the snap ring 35 can be forced in quickly and conveniently after completed tightening of the screw 1, this second embodiment is characterized by special ease of installation. An additional advantage is low production cost because snap rings of desired dimensions are commercially available at low cost.

Analogously, the third embodiment shown in FIGS. 7 to 9 differs from the above-described example only in that instead of an annular groove 37 with a round groove cross section, the corresponding annular groove 47 of the third embodiment has a rectangular groove cross section and is designed to hold a spring snap ring 45. Since the design and operation otherwise match the other embodiments, a detailed description is unnecessary. With this spring snap ring 45, installation is especially simple and has the advantage of low production costs, since these snap rings 45 can be obtained commercially at a low cost.

The fourth embodiment of FIGS. 10 to 12 differs from the above described examples essentially in two respects. First, the shaft 17 of the closure screw 1 has a narrow groove 40 extending in the longitudinal direction. Compared to the preceding examples with groove 20,

The invention claimed is:

1. A safety device for a pressure medium tank, comprising:
    a filling/checking port having an internally threaded hole adjacent an inner end thereof connectable to a tank interior and having an adjoining hollow cylindrical segment, said threaded hole and said cylindrical segment defining a flow passage through said port for passage of a medium therethrough;
    a closure screw having an externally threaded shaft and a head, said shaft being threadedly engaged with said threaded hole, said head being located and retained in said cylindrical segment, tightening of said screw in said threaded hole blocking said flow passage;
    a blocking element anchored in said cylindrical segment and forming stop surfaces projecting into an interior of said cylindrical segment to limit a free path of movement of said closure screw in said port in an unthreading direction to maintain threaded engagement of said threaded hole and said threaded shaft by coming into direct contact with said head of said closure screw; and
    a torque limiter coupled to said closure screw limiting torque that can be transmitted to said closure screw in the unthreading direction.

2. The safety device according to claim 1 wherein said cylindrical segment comprises a bottom extending to an opening edge of said threaded hole;

a seal on said bottom and adjoined by a bottom surface of said head in a closed position of said closure screw to form a seal therebetween; and said closure screw has a path of movement in said port limited to an unthreaded end position providing a distance between said seal and said head to form said flow path.

3. The safety device according to claim 1 wherein said blocking element comprises a cylindrical grooved pin received in a hole in an outer edge region of said cylindrical segment and extending transversely to a longitudinal axis of said cylindrical segment.

4. The safety device according to claim 1 wherein said blocking element comprises a snap ring received in an annular groove formed in an outer edge region of an inside wall of said cylindrical segment.

5. The safety device according to claim 1 wherein said blocking device comprises an elastic locking ring received in an annular groove formed in an outer edge region of an inside wall of said cylindrical segment.

6. The safety device according to claim 1 wherein said head of said closure screw comprises an axially extending sleeve defining a hexagon socket in an interior thereof and forming a reduced outside diameter portion of said head, said sleeve having a wall thickness that shears off when a certain torque exerted thereon is exceeded.

7. The safety device according to claim 1 wherein said closure screw is a gas filling screw; and said port is a filling port on a gas side of an hydraulic accumulator.

8. The safety device according to claim 1 wherein said head has greater cross-sectional dimensions than said threaded shaft; and said cylindrical segment has greater cross-sectional dimensions than said threaded hole.

9. The safety device according to claim 1 wherein said head has a wrenching recess coaxial with a longitudinal axis of said closure screw; and said blocking element is laterally offset relative to said wrenching recess.

10. The safety device according to claim 1 wherein said threaded shaft comprises an axially and laterally extending groove connecting a free end of said threaded shaft with a lateral surface thereof.

* * * * *